United States Patent [19]

Scharres et al.

[11] Patent Number: 4,764,312

[45] Date of Patent: Aug. 16, 1988

[54] ROOM HUMIDIFICATION SYSTEM

[75] Inventors: Harry J. Scharres, LaGrange; W. Samuel Grist; John A. Yarish, both of Chicago, all of Ill.

[73] Assignee: Louis A. Weiss Memorial Hospital, Chicago, Ill.

[21] Appl. No.: 915,040

[22] Filed: Oct. 2, 1986

[51] Int. Cl.[4] .......... B01F 3/04

[52] U.S. Cl. .......... 261/30; 261/78.2; 261/116; 261/DIG. 65; 239/306; 239/379; 239/418

[58] Field of Search .......... 261/DIG. 65, 116, 78.2, 261/30; 239/306, 379, 418, 432; 604/147

[56] References Cited

U.S. PATENT DOCUMENTS

| | | | |
|---|---|---|---|
| 1,158,574 | 11/1915 | Smith | 239/345 |
| 1,172,233 | 2/1916 | Day | 261/78.2 |
| 2,558,179 | 6/1951 | Howard | 261/78.2 |
| 2,655,407 | 10/1953 | Ingell | 239/327 |
| 2,887,275 | 5/1959 | Dixon, Jr. et al. | 239/432 |
| 2,890,765 | 6/1959 | Friedell | 261/78.2 |
| 2,906,513 | 9/1959 | Tabor | 261/73 |
| 3,199,790 | 8/1965 | Giesemann | 239/428 |
| 3,304,011 | 2/1967 | Paasche | 261/116 |
| 3,682,168 | 8/1972 | Deaton | 261/122 |
| 4,263,166 | 4/1981 | Adams | 261/78.2 |
| 4,303,601 | 12/1981 | Grimm et al. | 261/DIG. 65 |
| 4,330,086 | 5/1982 | Nysted | 261/78.2 |
| 4,335,804 | 6/1982 | Bardin et al. | 261/78.2 |
| 4,657,160 | 4/1987 | Woods et al. | 604/147 |

*Primary Examiner*—Tim Miles

*Attorney, Agent, or Firm*—Leydig, Voit & Mayer

[57] ABSTRACT

A hospital room humidification system operated from an outside source of pressurized oxygen and/or other gas for increasing the humidity of the ambient air in the room. The humidification system includes a collapsible bag for containing a quantity of water in a condition sealed from the environment of the room, an atomizing nozzle formed with separate liquid and gas passageways, a first adapter for coupling the atomizing nozzle to the water containing bag, and a second adapter for selectively coupling the atomizing nozzle to the outside pressurized gas source. The atomizing nozzle is operable for causing the pressurized gas flow discharging from the air passageway to break the flow of liquid discharging from the liquid passageway into fine liquid particles and to directly dispense such particles into the air of the room in the form of a mist and in a manner which significantly increases the humidity of the ambient air in the room. Orifice plates are provided in the gas and liquid flow streams to the atomizing nozzle for maintaining substantially constant pressure and flow conditions in the liquid and gas passageways, notwithstanding significant fluctuations in gas and liquid pressure upstream of the orifice plates. The humidification system is operable with relatively small quantitites of pressurized gas, and hence, is adapted for operation from existing sources of pressurized oxygen available in most hospital rooms.

4 Claims, 1 Drawing Sheet

ROOM HUMIDIFICATION SYSTEM

DESCRIPTION OF THE INVENTION

The present invention relates generally to humidification systems, and more particularly, to humidification systems particularly adapted for use in hospital rooms.

Patients with respiratory problems under hospital care frequently require added humidification to the air in their room in order to enhance breathing. While nebulizing types of humidifiers have long been available which utilize a spinning disc or the like to create and dispense a liquid mist from an open pan or reservoir of water in the device, such humidifiers now generally have been found to be unacceptable for hospital usage. Because unfiltered air is drawn into the humidifier from the room, microorganisms carried into the water reservoir with the air contaminate the interior of the device, and within a relatively short period, are entrained in the liquid dispensed into the atmosphere of the room. The operating time for these units generally cannot exceed 24 hours, after which time they must be sterilized or replaced with a new unit, both procedures being expensive. Such humidifiers also are relatively noisy in operation, require cumbersome handling of open water pans when replenishing the water supply, and do not permit humidification with sterile water since the liquid is exposed to the ambient air while maintained in the reservoir. While humidifiers have been proposed which utilize a compressed air source for atomizing and dispensing the liquid, such humidification systems generally require large amounts of compressed air to achieve sufficient atomization of the liquid, and hospital compressor systems often are of inadequate capacity, particularly if a number of humidifiers are operated simultaneously. Such humidifiers also usually require expensive valving arrangements for controlling the liquid and air flows in a manner necessary to achieve proper atomization of the liquid. While still other types of humidifiers are available, such as boiling water systems, these systems again are relatively expensive and usually require considerable maintenance. Hence, notwithstanding the need for supplying humidified air into the rooms of selected patients under hospital care, many hospitals today have no means for providing such increased humidification.

It is an object of the present invention to provide an improved humidification system that is adapted to increase the humidity of ambient air in a room in a safe, efficient, quiet and convenient manner.

Another object is to provide a humidification system as characterized above which is less subject to contamination from microorganisms in the air of the room in which it is used.

A further object is to provide a humidification system of the foregoing type that can use either sterilized or tap water and which lends itself to easy replenishment of the water supply without cumbersome handling of open trays and the like.

Yet another object is to provide a humidification system of the above kind which is adapted for operation from existing sources of pressurized oxygen and/or other gases available in most hospital rooms. A related object is to provide such a humidification system that is operable with relatively small quantities of pressurized gas.

Still a further object is to provide a humidification system of the above type which is relatively simple and economical in construction, and which lends itself to easy disassembly and sterilization.

Yet another object is to provide a humidification of the above kind which utilizes a collapsable water containing bag and a fluid supply line which are made of inexpensive plastic material, and hence, can be disposed of after use with a given patient in a hospital room environment.

Other objects and advantages of the invention will become apparent upon reading the following detailed description and upon reference to the drawings, in which.

Figure 1:
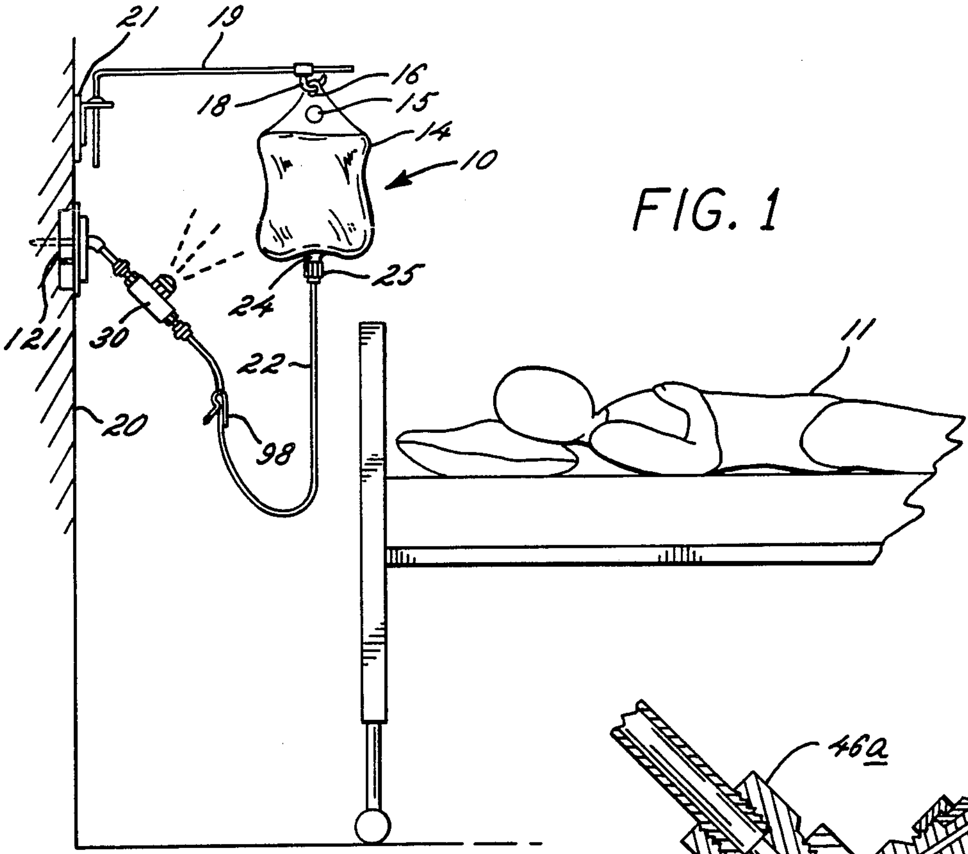
FIG. 1 is a side elevational view of a humidification system embodying the present invention shown in use in a hospital room.

While the invention is susceptible of various modifications and alternative constructions, certain illustrated embodiments thereof have been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

Referring now more particularly to FIG. 1 of the drawings, there is shown an illustrative humidification system 10 embodying the present invention shown in use in a hospital room for increasing the humidity of the ambient air in the room, such as is necessary for inhalation therapy of a patient 11 under care in such room. As is customary, the hospital room has an existing supply of pressurized oxygen from an outside source, the oxygen being supplied to the room through a wall inlet 12. The wall inlet 12 may be of a conventional type, such as is commercially sold by the Chemetron Medical Division of Allied Healthcare Products, Inc. Such wall inlets are adapted to selectively receive a fitting or adapter of an oxygen supply line when hospital personnel find it necessary to use oxygen for patient's care, and upon insertion of the fitting into the wall inlet, the pressurized oxygen supply is automatically communicated through the fitting. It will be understood that while the invention will be described in connection with use of pressurized oxygen from such an existing oxygen supply in a hospital room, the humidification system 10 can be used with compressed air or other gases which might be available from an outside source so as to be free of contamination from the ambient air in the patient's room.

For providing a continual supply of water without auxiliary pressurization means, the humidification system 10 includes a sealed liquid container 14 suspended in an elevated condition in the room. The illustrated container 14 is a flexible and collapsible plastic bag having a removable stopper 15 which permits easy filling. Since the container 14 is in a sealed condition when the stopper 15 is in place, it may be filled with distilled or sterile water, which is protected from exposure to the ambient air in the room. For suspending the bag 14 in elevated position in order to achieve proper gravity flow of water therefrom, as will become apparent, an upper portion of the bag 14 is formed with an aperture 16 which is positionable onto a hook 18, that is in turn is supported on the end of a cantilever arm 19 secured to a wall 20 of the room by a suitable mounting bracket 21. A flexible water supply conduit 22, preferrably made of lightweight plastic, is connected to a discharge spout 24 on the underside of the bag 14 by a suitable coupling 25.

In accordance with the invention, the humidification system includes an atomizing nozzle that is selectively connectable both to the water supply container and the compressed gas inlet and which receives converging streams of pressurized gas and liquid in a manner such that the pressurized gas breaks the liquid into relatively fine liquid particles and directly dispenses such particles into the air of the room in the form of a fine mist or fog. To this end, a nozzle 30 is provided which in this case comprises first and second body members 31, 32. The second body member 32 is formed with a threaded lowermost hub 34 that engages a threaded aperture formed in one side of the first body member 31 such that a second body member 32 is supported outwardly therefrom in perpendicular relation.

For receiving a supply of liquid from the liquid supply container 14, the first body member 31 has a threaded liquid inlet 36 which is engaged by a threaded fitting 38 of an adapter 39. The adapter 39, which in this case communicates with the fitting 38 through a union 40, is formed with a serated end 41 over which the liquid conduit 22 may be manually positioned and retained.

For receiving a supply of pressurized gas from the wall inlet 12, the first nozzle body member 31 also is formed with a threaded air inlet 45 at its opposite end that is engaged by a threaded fitting 46 of a gas supply adapter 48. The gas supply adapter 48 in this case is connected to the fitting 46 through an elbow 49 and union 50. The gas supply adapter 48 includes an inlet prong 51 formed with an inlet aperture 52 that is insertable into the wall inlet 12 in a conventional manner. The inlet prong 51 extends rearwardly from a mounting plate 54, which limits the insertion of the prong 51 into the wall inlet 12. A hook 55 in this instance also is mounted in rearwardly extending fashion from the mounting plate 54 and is simultaneously positionable into the wall inlet 12 for securing the adapter 48 in mounted position.

The atomizing nozzle 30 has a central, axially disposed liquid passageway 60 formed in the second body member 32 which communicates with a central chamber 61 and port 62 formed in the first body member 31, which in turn communicates with the liquid inlet 36. The second body member 32 is further formed with an air passageway 64 disposed in axially offset and slightly angled relation to the liquid passageway 60. The air passageway 64 communicates with a port 65 and chamber 66 in the first body member 31, which in turn communicate with the air inlet 45. Hence, it can be seen that liquid supplied to the liquid inlet 36 of the atomizing nozzle will be directed through the port 62, chamber 61, and axial passageway 60. Pressurized oxygen, air, or other gas introduced into the gas inlet 45 will be directed through the chamber 66, port 65 and gas passageway 64.

To facilitate atomization and dispensing of the liquid stream exiting from the liquid passageway 60, an air cap 70 having a discharge orifice 71 is mounted on the end of the second body member 32 by means of a retaining ring 72. To effect such mounting, the air cap 70 is formed with a radial flange 74 which seats on a radial shoulder of the second body member 31. The retaining ring 72 may be threaded onto a threaded outer peripheral section of the second body member to tightly clamp the air cap 70 in mounted position.

For distributing pressurized gases exiting from the air passageway 64 about the discharging liquid stream from the liquid passageway 60, the second body member 31 is formed with an outwardly extending tapered portion 76 which, in conjunction with the air cap 70, defines an annular air chamber 78. Pressurized gases within the chamber 78 act to effectively break the discharging liquid flow from the liquid passageway 60 into atomized particles and to forcefully direct such particles through the discharge orifice 71 of the air cap into the atmosphere.

In keeping with the invention, means are provided for regulating the flow and pressure of the liquid and gas streams directed to the atomizing nozzle so that with relatively small quantities of pressurized gas, and hence with a relatively small capacity air compressor, an atomized mist is effectively formed which remains suspended in a quiescent atmosphere, such as in a hospital room, for a sufficient period to completely evaporate into the ambient air prior to floating to floor level. The flow and pressure regulating means in illustrated embodiment comprises orifice plates 80, 81 disposed in the respective gas and liquid supply lines to the atomizing nozzle 30. The orifice plates 80, 81 each are formed with a respective relatively small diameter, centrally disposed, orifice 82, 84, preferably in the range of about 0.002 to 0.020 inches, which effectively maintain substantially constant downstream pressure and flow conditions, regardless of significantly greater pressures of the flow streams upstream of the orifice plates.

Figure 3:
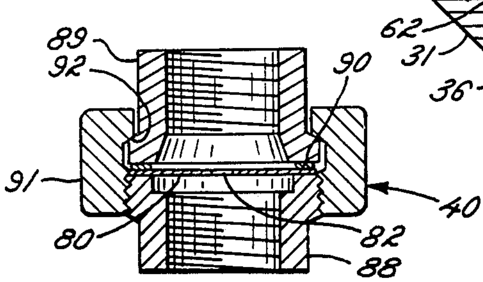
FIG. 3 is an enlarged section taken in the plane of line 3—3 in FIG. 2.

The liquid control orifice plate 80 in this instance is supported within the union 40 adjacent the inlet fitting 38, and the air control orifice plate 81 is disposed within the union 50 adjacent the liquid inlet filling 46. As shown in FIG. 3, the union 40 is comprised of two pipe sections 88,89 disposed in end to end abutting relation with the orifice plate 80 interposed therebetween. A seal 90 is provided for preventing leakage of fluid about the perimeter of the orifice plate. A collar 91 threadably engages one of the pipe sections 88 and has a shoulder 92 bearing against a radial flange portion of the other pipe section 89. The union 50 which retains the gas flow orifice plate 81 is of similar construction. In practice, it has been found that with orifice openings 82, 84 of about 0.008 inches in diameter, substantially constant, desired flow conditions are maintained downstream of the orifice plates 80, 81 for generating the fine liquid atomization with relatively small quantities of compressed air, notwithstanding significant variations in pressure of the compressed gas from the outside source, such as will occur in different hospitals, and notwithstanding different water pressures to the liquid orifice plate, such as occurs by maintaining the liquid supply container at different elevations above the nozzle.

Figure 2:
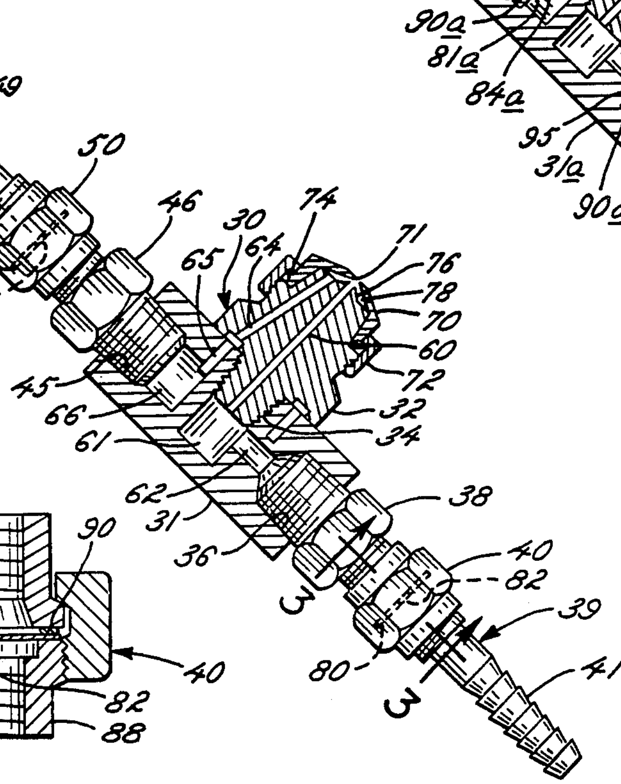
FIG. 2 is an enlarged fragmentary section of the atomizing nozzle utilized in the illustrated humidification system.
Figure 4:
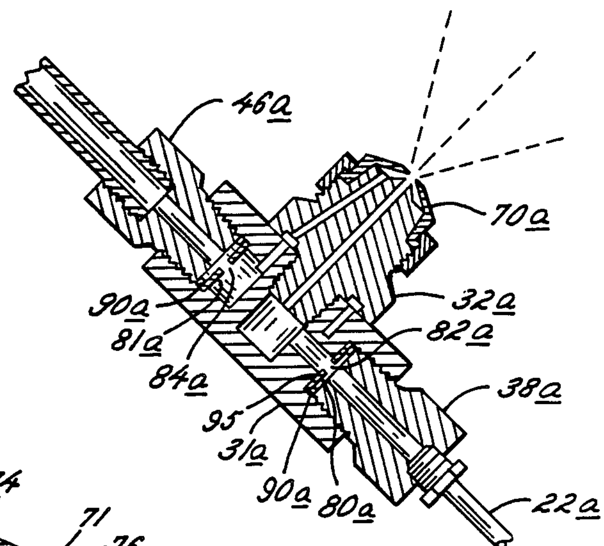
FIG. 4 is an alternative embodiment of atomizing nozzle for use in the humidification system of the present invention.

Referring to FIG. 4, there is shown an atomizing nozzle similar to that shown in FIG. 2, but with an alternative mounting of the orifice plates. Similar items to those previously described have been given similar reference numerals with the distinguishing suffix "a" added. It can be seen that in the embodiment of FIG. 4 the orifice plates 80*a*, 81*a* are disposed within the first body member 31*a* of the atomizing nozzle 30*a*. In this instance, the liquid orifice plate 80*a'* is interposed between the end of the inlet fitting 38*a* for the liquid conduit 22*a* and a shoulder 95 formed within the first body member 31*a*. An O-ring seal 90*a* is interposed about the periphery of the orifice plate to prevent leakage. The gas orifice plate 81 is similarly retained against a shoulder in the first body member by the inlet fitting 46*a*.

In accordance with a further feature of the invention, the atomizing nozzle 30 is disposed at an angle of about 45° with respect to the vertical such that the atomized spray discharges in a generally upwardly and outwardly direction across the room such that the liquid particles remain airborne for sufficient time such that they ultimately will evaporate prior to floating to floor level. In the illustrated embodiment, such angular orientation of the nozzle 30 is achieved by virtue of the elbow 49 which supports the inlet fitting 46 at such angle with respect to the gas adapter mounting plate 54.

In operation of the humidification system 10, it can be seen that the collapsible bag 14 may be filled with water, which may be sterile or tap water, and upon replacement of the stopper 15, the water supply is maintained in a sealed condition from the environment of the room. Because the water supply bag 14 is supported by the cantilever rod 19 at an elevation above the nozzle 30, water will flow through the discharge spout 24 and flexible conduit 22 under gravity force and will be directed to the liquid orifice plate 80 in a pressurized condition. As water drains from the bag 14, the bag simply collapses so that there need be no venting to the outside atmosphere. The diameter of the orifice 82 in the liquid orifice plate 80 establishes the predetermined pressure and flow conditions downstream of the orifice plate 80 and through the liquid inlet 36, port 62, chamber 61 and axial passageway 60 of the atomizing nozzle. Insertion of the adapter 48 into the oxygen or gas supply wall inlet 12 causes a pressurized gas flow through the adapter 48 and gas orifice plate 81. The diameter of the orifice 84 establishes the predetermined flow and pressure conditions of the gas downstream of the orifice plate 81 and through the gas inlet 45, chamber 66, port 65, air passageway 64 and annular chamber 78 in the atomizing nozzle. The gas pressure in the annular chamber 78 causes the liquid stream discharging from the liquid passageway 60 to be broken up into relatively fine liquid particles and discharged into the atmosphere of the room in the form of a fine mist or fog, which remains suspended in the atmosphere of the room for a sufficient period to completely evaporate prior to floating to floor level, hence significantly increasing the humidity of the room. By virtue of the angular upwardly and outwardly discharge of the mist from the atomizing nozzle, the humidity of normal sized hospital rooms can be increased sufficiently for most therapeutic needs. To discontinue operation of the humidification system 10, a simple pincher claim 98 may be used to pinch the flexible liquid conduit line 22 and interrupt the flow of water to the atomizing nozzle 30. To shut off the supply of pressurized gas to the nozzle, the adapter 48 may be removed from the wall inlet 12. The water remaining in the bag 14 need not be emptied since it is sealed from the outside environment.

It will be appreciated that upon completion of use of the humidification of the present invention with one patient in a hospital room environment, the nozzle 30 may be readily disassembled from the gas supply adapter 48 and the liquid supply adapter 39 by unscrewing the fittings 46 and 40 in the embodiment of FIGS. 1–3, so as to permit effective sterilization of the nozzle and the gas and liquid inlet adapters. The unions 40, 50 may also be disassembled for cleaning and sterilization of the orifice plates 80, 81. Since the collapsable bag 14 and the liquid supply conduit 22 can be made of relatively inexpensive plastic material, it will be understood that these items simply may be disposed of after use with a given patient.

From the foregoing, it can be seen that the humidification system of the present invention is adapted to increase the humidity of ambient air in hospital rooms in a safe, efficient, quiet and convenient manner. Because the water supply is sealed from the environment of the ambient air and because the pressurized gas supply is directed into the room from an outside source, the humidity added to the room may be sterile. The humidification system is operable with relatively small quantities of pressurized gas, and hence, is adapted for operation from existing sources of pressurized oxygen available in most hospital rooms. The system is relatively simple and economical in construction and is easy to maintain.

We claim as our invention:

1. A room humidification system comprising a wall mounted gas inlet, means for supplying pressurized oxygen gas from a source outside said room to said wall mounted inlet, means for containing a quantity of water in a condition sealed from the environment of said room, an atomizing nozzle formed with a liquid passageway and a gas passageway, first coupling means for connecting said liquid passageway to said water containing means, second coupling means including an adapter engagable in said wall mounted gas inlet for selectively connecting the gas passageway of said atomizing nozzle to said wall mounted gas inlet such that a pressurized flow of gas may be directed from said outside source through said gas passageway, means supporting said nozzle on said adapter so that said nozzle is mountable on the wall as an incident to engaging said adapter in said gas inlet, and said nozzle being operable for causing the pressurized gas flow discharging from said gas passageway to break the flow of liquid discharging from said liquid passageway into fine liquid particles and to directly dispense such particles into the atmosphere of the room in the form of a fine mist and in a manner which increases the humidity of the atmosphere in said room.

2. The humidification system of claim 1 wherein upon engaging said adapter in said wall mounted gas inlet said nozzle supporting means supports said nozzle such that particles dispensed therefrom are directed upwardly and outwardly into the atmosphere of the room so as to remain airborne for sufficient time to evaporate into the ambient air prior to floating to floor level.

3. The humdification system of claim 1 in which said nozzle includes a body formed with said liquid passageway and gas passageway, said body having a generally T-shaped configuration and with a gas inlet at one end of said body communicating with said gas passageway and a liquid inlet at another end of said body communicating with said liquid passageway, said one end of said body being directly coupled to said adapter for permitting communication of gas flow from said wall mounted gas inlet through said body gas inlet and gas passageway, and said other body end being connected to said first coupling means for permitting liquid flow through said body liquid inlet and liquid passageway.

4. The humidification system of claim 3 in which said nozzle includes a cap member that defines a nozzle discharge orifice and is mounted on said body intermediate said ends thereof.

* * * * *